United States Patent [19]

Mander et al.

[11] Patent Number: 4,765,648
[45] Date of Patent: Aug. 23, 1988

[54] SUSPENSION SYSTEM FOR A MOTOR VEHICLE

[75] Inventors: Philip E. Mander, Stratford-on-Avon; Jonathan A. Fuller, Warwick, both of England

[73] Assignee: Gaydon Technology Limited, Lighthorne, England

[21] Appl. No.: 44,998

[22] Filed: Apr. 30, 1987

[30] Foreign Application Priority Data

May 2, 1986 [GB] United Kingdom ............... 8610842

[51] Int. Cl.[4] .............................................. B60G 11/26
[52] U.S. Cl. .................................... 280/707; 280/714; 267/64.18; 267/64.22
[58] Field of Search ..................... 280/707, 714, 64.18, 280/64.22

[56] References Cited

U.S. PATENT DOCUMENTS

| 3,124,368 | 3/1964 | Corley et al. | 280/6 R |
|---|---|---|---|
| 3,861,696 | 1/1975 | Gustafsson | 280/707 |
| 4,368,900 | 1/1983 | Beusse | 280/707 |
| 4,506,909 | 3/1985 | Nakashima et al. | 280/707 |
| 4,540,188 | 9/1985 | Meloche et al. | 280/707 |
| 4,575,116 | 3/1986 | Miyata | 280/707 |

FOREIGN PATENT DOCUMENTS

| 0151421 | 8/1985 | European Pat. Off. . |
|---|---|---|
| 0162448 | 11/1985 | European Pat. Off. . |
| 0162818 | 11/1985 | European Pat. Off. . |
| 0167159 | 8/1986 | European Pat. Off. . |
| 0205645 | 12/1986 | European Pat. Off. . |
| 2068308 | 6/1981 | United Kingdom . |
| 2150258 | 6/1985 | United Kingdom . |

OTHER PUBLICATIONS

Suspension Control Device, vol. 10, Number 142 (M-481) (2199), May 24, 1986, 1 page, Appln. No. 59-122608.

Control Device for Vehicle Variable Damper, vol. 8, Number 143, (M-306) (1580), Jul. 4, 1984, Appln. No. 57-152133.

Damping Force Adjusting Device for Shock Absorber, vol. 7, Number 177 (M-233) (1322), Aug. 5, 1983, Appln. No. 56-177998.

*Primary Examiner*—Kenneth R. Rice
*Attorney, Agent, or Firm*—Hayes, Davis & Soloway

[57] ABSTRACT

The system comprises a spring between the vehicle body and each wheel, a shock absorber associated with each spring and which is switchable electromagnetically between soft and hard settings, one or more accelerometers measuring vertical acceleration of the vehicle body, an electronic filter for filtering the signals from the accelerometer to select a band width of frequencies, either side of the primary ride frequency of the vehicle, and control means for switching the shock absorbers between the soft and hard settings whenever a predetermined level of vertical motion within this band width is exceeded either in the bump or rebound directions.

11 Claims, 8 Drawing Sheets

SUSPENSION SYSTEM FOR A MOTOR VEHICLE

This invention relates to a suspension system for a motor vehicle.

The suspension of a vehicle has traditionally consisted of a hub and wheel supported by a rubber tire with a relatively soft spring supporting the body above the hub. The mass supported by the spring is considered "sprung" and the mass not supported by the spring, but supported by the tire is considered "unsprung". The purpose of the spring is to isolate the body from road undulations. However, there are two resonances associated with such systems which tend to transmit undulations to the body. The first of these, the resonance of the sprung mass on the spring, manifests itself in a four-wheel car as the "primary ride" resonances and these are usually described by the terms "bounce", "heave", "pitch" and "roll". The frequencies of these resonances typically occur in the range 0.8–4.0 Hz. The second resonancae, that of the unsprung mass on the spring stiffness offered by the tire, is called 'wheel-hop' and typically occurs at frequencies in the range 10–15 Hz.

The traditional suspension described above will isolate the body, or sprung mass, from road inputs above the primary ride frequencies, with the exception that, at wheel hop frequency, the resonance enhances transmission to the body of any road inputs of that frequency. Resonance at any of the primary ride frequencies also enhances transmission giving larger body motions than would occur if the suspension were infinitely rigid.

These two resonant transmission peaks are controlled by the final element of the conventional suspension, the hydraulic damper. This operates in parallel with the spring, between the sprung and unsprung masses. The introduction of damping reduces vibration levels at the resonant frequencies, but at the expense of higher transmission over the remaining frequency range. The value of damping chosen is thus a compromise between control of the resonances and reduction of vibration levels transmitted at frequencies away from the resonant frequencies. This compromise is a result of the nature of the hydraulic dampers conventionally used in the automotive industry, in that the damping force produced is defined solely by the relative velocity of the sprung and unsprung masses. Thus, for a given instantaneous relative velocity, the same damping force is produced regardless of whether the velocity is produced by large, low frequency, motions or by smaller, higher frequency, motions. This is a fundamental limitation on the suitability of the conventional damper for controlling the suspension under all conditions.

It is known from European Patent Application No. 0151 421 A to provide a suspension system having a sensor to sense verticle displacement of the vehicle body from the road and to supply a signal indicative of that measurement to a filter means which filters the signal into a high frequency component which is rectified to produce a direct-current signal indicative of unsprung mass vibration and a low frequency component which is rectified to produce a direct-current signal indicative of body vibration the system being arranged to automatically switch the damping strength of the shock absorbers to a stiffer mode of operation in both directions of operation when the direct-current signal indicative of low frequency vibration exceeds a reference level.

This system has the disadvantage that it is relatively complex and hence expensive to produce.

It is an object of this invention to produce a simpler and hence cheaper suspension system.

According to this invention there is provided a suspension system for a vehicle comprising: at least one resilient means connecting a sprung mass and an unsprung mass; at least one damping means switchable between a relatively soft setting and a relatively stiff setting for damping relative motion between the sprung mass and the unsprung mass; a sensor means for sensing motion of the sprung mass; filter means for filtering a signal from the sensor to select a predetermined band width of frequencies of motion of the sprung mass; and control means for switching the damping means between the relatively soft and relatively stiff settings in response to a signal received from the sensor means characterized in that each of the damping means has a relatively stiff and soft setting in both the bump and rebound directions and that the damping means are switched to the relatively stiff setting when the motion of the sprung mass in either direction exceeds a predetermined level set for that direction of motion.

This has the advantage that different levels of motion can be set in the bump and rebound directions to take account of the different characteristics of body motion in these directions.

The pre-determined level may be a level of vertical acceleration.

The shock absorbers may be switched to their relatively stiffer setting only while the pre-determined level is exceeded.

Alternatively the damping settings may be switched to the relatively stiff setting at the first peak vertical acceleration of the sprung mass following the pre-determined level being exceeded.

This results in switching occuring more smoothly and with less noise.

Preferably, the damping effect in each direction may be restored to the relatively soft settings at the first peak in acceleration of the sprung mass which does not exceed the pre-determined level.

This results in switching occuring more smoothly and with less noise.

Additionally, if no further peak acceleration is sensed within a pre-determined period of time then the damping settings may be restored to the relatively soft setting.

This prevents the shock absorbers remaining in their relatively stiff setting for long periods of time.

The pre-determined level may be a level of vertical velocity of the sprung mass, in which case the damper settings may be switched to the relatively stiff setting on the first occasion that the direction of motion changes after a pre-determined level of vertical velocity has been exceeded and may be restored to the relatively soft setting on the first occasion when the direction of motion of the sprung mass changes following a peak in velocity which does not exceed the pre-determined level.

The suspension system may have in addition to the relatively stiff and soft settings a further relatively harder setting the control means being arranged to switch the damping means between the relatively stiff and soft settings below a pre-determined vehicle speed and between the relatively stiff and harder settings above the pre-determined vehicle speed.

This has the advantage that greater control over body movement is provided at high vehicle speeds without sacrificing ride comfort at low vehicle speeds.

Other preferred features of the invention will be apparent from the following description and from the subsidiary claims of the specification.

The invention will now be described by way of example with reference to the accompanying drawings, in which.

Figure 1:
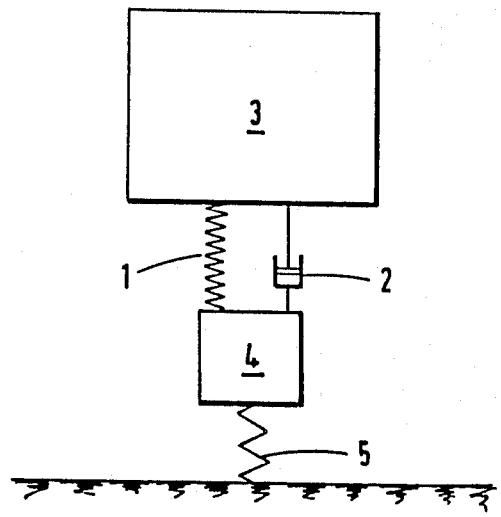
FIG. 1 is a schematic diagram of a conventional suspension system.
Figure 2:
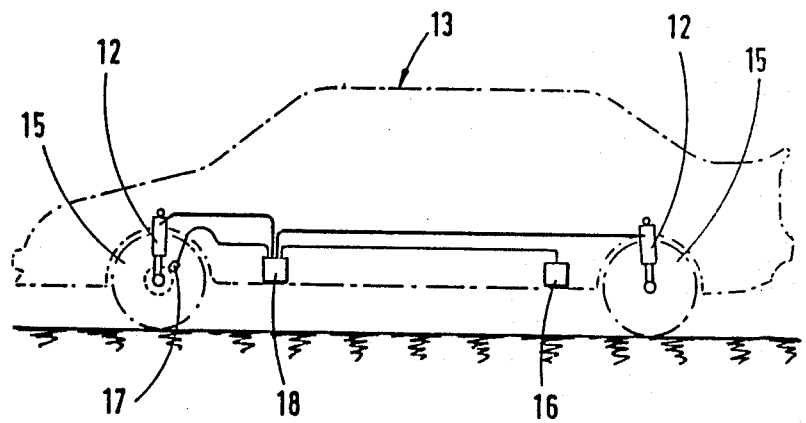
FIG. 2 is a schematic side view of a vehicle having a suspension system according to this invention.
Figure 3:
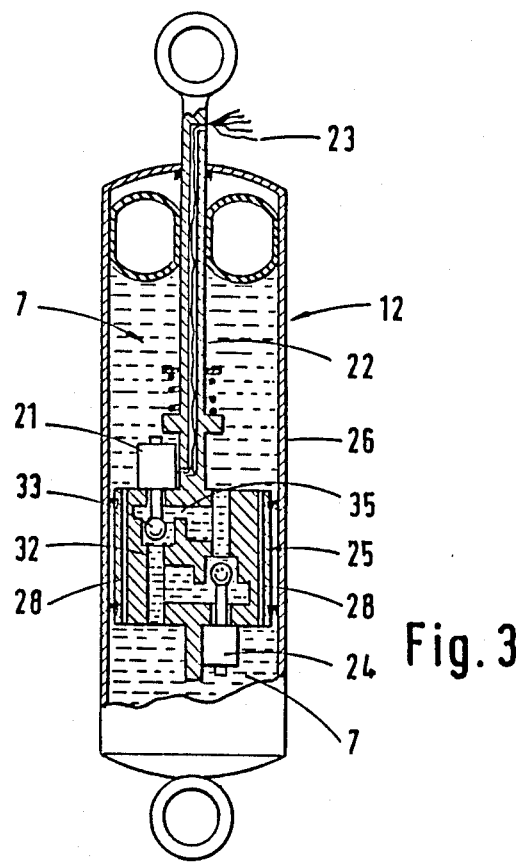
FIG. 3 is a cross section through a shock absorber forming part of the suspension system shown in FIG. 2.

FIG. 1 is a schematic diagram of a conventional suspension system as described above in which a spring 1 and damper 2 connect a sprung mass 3 and an unsprung mass 4. A spring 5 is also shown to represent the spring provided by the tire between the ground and the unsprung mass 4.

The suspension system according to the first embodiment of the invention seeks to compromise between the requirement to provide low damping, to prevent the transmission of vibration at 'wheel-hop', and the requirement to provide high damping to prevent 'float' at primary ride frequency.

With reference to FIGS. 2 to 6, 8 and 11 there is shown a motor vehicle having a body 13, a number of road wheels 15 and a suspension system to provide a damped resilient connection between the wheels 15 and the body 13 forming a sprung mass.

The suspension system comprises a number of dampers or shock absorbers 12, a number of road springs (not shown) an accelerometer 16 connected to the body 13, a microprocessor based control system 18, and a vehicle forward speed transducer 17.

Each of the shock absorbers 12 has a casing 26 in which is slidably supported a piston 25 adapted for connection to part of the body 13 of the vehicle by means of a tubular rod 22.

The piston 25 includes a number of bypass passages 28 and first and second solenoid valves 21,24. The first solenoid valve 21 closes when energised to increase the stiffness of the shock absorber in the bump direction of travel and the second solenoid valve 24 closes when energised to increase the stiffness of the shock absorber in the rebound direction of travel.

The first and second solenoid valves 21 and 24 are connected to the control system 18 by means of a multicored wire 23 which passes along the bore of the tubular rod 22.

Figure 4:
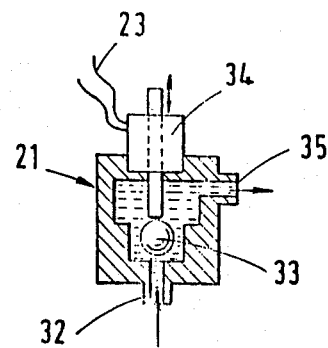
FIG. 4 is a cross section through a valve member forming part of the shock absorber shown in FIG. 3.

The principle of operation of the two solenoid valves can be best understood with reference to FIG. 4 of the drawings. As the shock absorber is compressed the fluid 7 is forced into the valve 21 through the bleed orifice 32 which is partially obstructed by a sphere 33. The sphere 33 is urged towards the orifice 32 by the solenoid 34, when energised in response to a signal from the control system 18, to close off the orifice 32.

The position that the sphere 33 adopts therefore determines the damping effect of the shock absorber 12, if the orifice 32 is closed off by the sphere 33 then fluid 7 can only be transferred from one side of the piston 25 to the other through the bypass passages 28 thereby greatly increasing the damping effect of the shock absorber. If the solenoid is not energised then the sphere 33 is moved back by the flow of the fluid 7 through the orifice 32 and the restriction to flow is that primarily caused by the orifice 32 itself and the damping effect is thus reduced. Flow of the fluid 7 in the other direction will cause the sphere 33 to be moved against the orifice thereby preventing flow in this direction once contact between the sphere 33 and the orifice 32 has been obtained so that the damping effect in the opposite direction of motion is not effected, each of the solenoid valves 21, 24 acting as a non-return valve.

The other solenoid valve operates in the same manner as that previously described but being mounted in the piston 25 in the opposite sense so that it controls the flow of fluid 7 during rebound motion of the body 13.

The piston 25 may of course be provided with conventional valves in addition to the solenoid valves mentioned to provide different damping effects in opposite directions when the solenoid valve for that direction of motion is closed. The remainder of each of the shock absorbers 12 is entirely conventional in construction and needs no further description.

The accelerometer 16, in the form of a piezoelectric accelerometer, measures the vertical acceleration of the vehicle body 13, and sends a signal indicative of this movement to the control system 18 to act as the primary control parameter for the suspension system.

The control system 18 comprises a first filter 40 to filter out frequencies below 0.3 Hz, a second filter 41 to filter out frequencies above 4.5 Hz, a central processor unit including a pre-programmed RAM unit 45A,45B, a pre-programmed ROM unit 46 and a pair of power amplifiers 43A,43B.

In operation a signal from the accelerometer 16 is transmitted to the filters 40,41 for signal conditioning. The filtered signal which represents acceleration of the body 13 only in the range of primary ride frequency is the sent to the central processor unit 42. Initially, the signal is converted into a digital signal and then is read in as the primary data for the program stored in the RAM part of the central processor 42. The program reads the data from the accelerometer 16 and compares it with predetermined threshold levels of vertical acceleration for the bump and rebound directions of motion which are stored in digital form in the ROM 46. The logical processes that occur are illustrated by the flowchart shown in FIG. 6.

Figure 11:
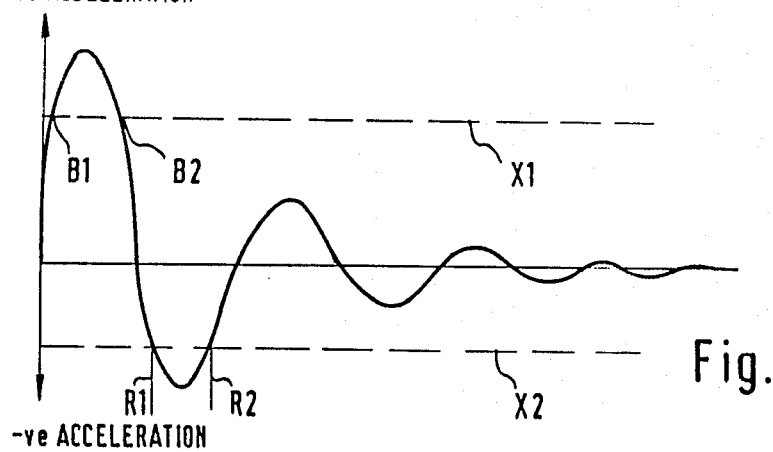
FIG. 11 is a graph of sprung mass vertical acceleration against time for the suspension system shown in FIGS. 2 to 6 showing the switching points.

With particular reference to FIG. 11, if the data from the accelerometer 16 indicates that the value of vertical acceleration in the bump direction has exceeded the pre-determined threshold value X1 such as a point B1 then a control signal is sent to the amplifiers 43A,43B by the respective RAM 45A. The signal received by the amplifiers 43A,43B causes them to be activated and supply an energising signal to each of the solenoid valves 21,24. The energisation of the valves 21,24 will cause the damping of the body 13 to be increased from its normally relatively soft setting to a relatively stiff setting. The damping will stay at this relatively stiff setting until the central processor unit 42 senses that the level of acceleration in that direction has fallen below the pre-determined threshold level X1 such as at point B2 at which time the control signal to the amplifier 43A,43B and the energising signal to the solenoid valves 21,24 will be switched off restoring the shock absorbers 12 to their normally relatively soft setting.

Similarly, if the data from the accelerometer 16 indicates that the value of vertical acceleration in the rebound direction has exceeded the pre-determined threshold level X2 such as at point R1 then a control signal is sent from RAM 45B to the amplifiers 43A,43B. The signal received by the amplifier 43A,43B causes them to be activated and supply an energising signal to each of the solenoid valves 21,24. The energisation of the valves 21,24 will cause the damping of the body 13 to be increased from its normally relatively soft setting to a relatively stiff setting. The damping will stay at this relatively stiff setting until the central processor unit 42 senses that the level of acceleration in that direction has fallen below the pre-determined threshold level X2 such as at point R2 at which time the control signal to the amplifiers 43A,43B and the energising signal to the solenoid valves 21,24 will be switched off restoring the shock absorbers to their normally relatively soft setting.

As can be seen on FIG. 11 the pre-determined level X1 of vertical acceleration in the bump direction is set at a higher level than the pre-determined level X2 for the rebound direction. Normally the level X1 is set at 1.5 to 3.0 times that of level X2.

There is therefore control over the stiffness of the shock absorbers 12 in both directions of motion and the level at which switching from a relatively soft setting to a relatively stiff setting occurs is different for the bump and rebound directions.

Figure 8:
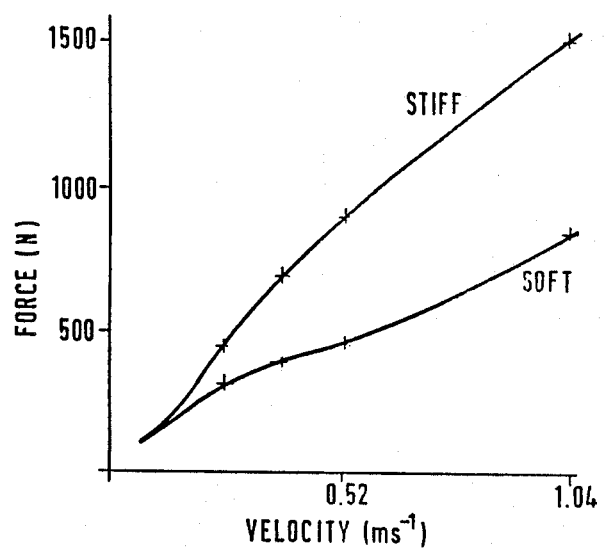
FIG. 8 is a graph showing typical characteristics of the shock absorber shown in FIG. 3 when set to a stiff or soft setting.
Figure 5:
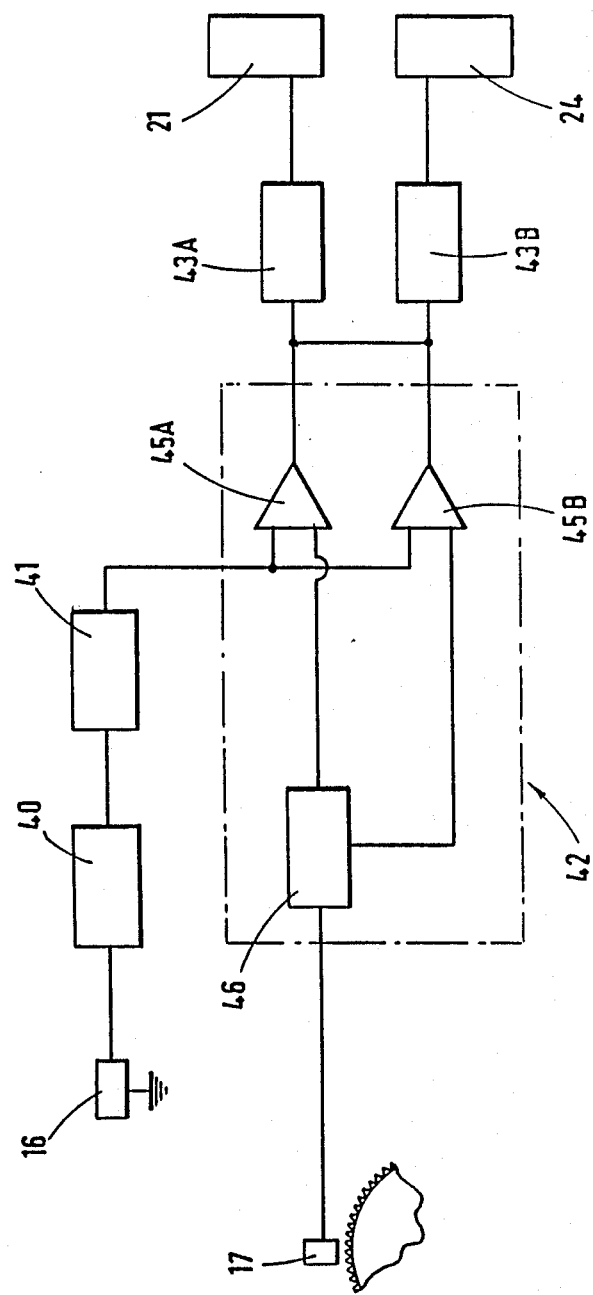
FIG. 5 is a block diagram of a control system forming part of the suspension system shown on FIG. 2 according to a first embodiment of the invention.
Figure 6:
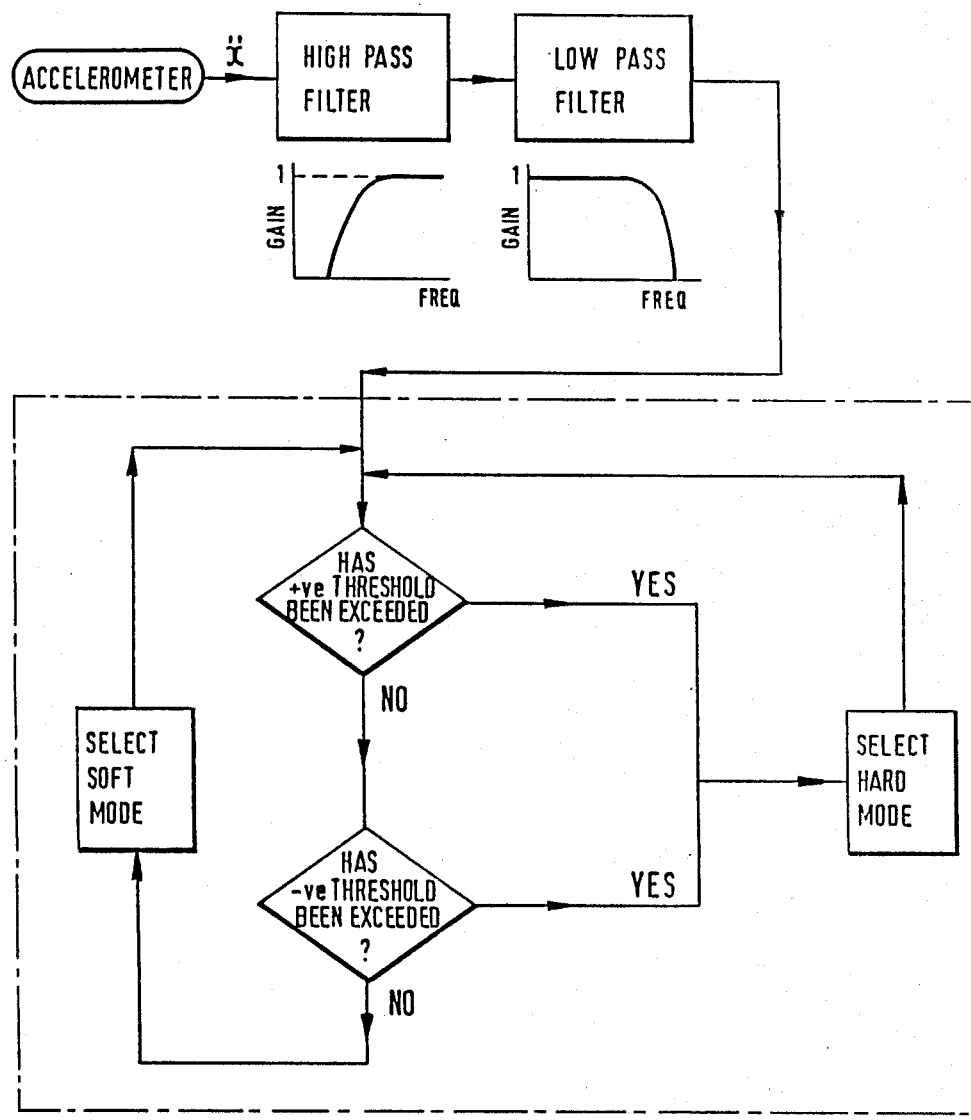
FIG. 6 is a flow chart of the control program for the control system according to the first embodiment of the invention.

FIG. 8 illustrates typical characteristics of the soft and stiff settings of the shock absorbers 12.

The vehicle is thus controlled to within set limits of vertical acceleration within the limited frequency range related to the body primary ride frequency by increasing the damping only under these clearly defined conditions. The softer damping can then be used at all other times to reduce high frequency input transmission to the sprung mass.

The electronic circuitry required to achieve these control strategies is well understood and will not therefore be described in detail.

The system is able to respond very quickly whenever the acceleration thresholds are exceeded due to the rapid response times of the solenoid valves 21,24 used within the shock absorbers 12. A response time of 10msec can be achieved with this arrangement which means that the shock absorbers 12 are quite capable of being switched into and out of the stiffer setting within one cycle of the motion of the vehicle body. Besides being provided with the electromagnetically controlled valves, the shock absorbers 12 can be otherwise conventional so there is no difficulty in arranging different levels of damping to be applied in the bump and rebound directions.

Figure 7:
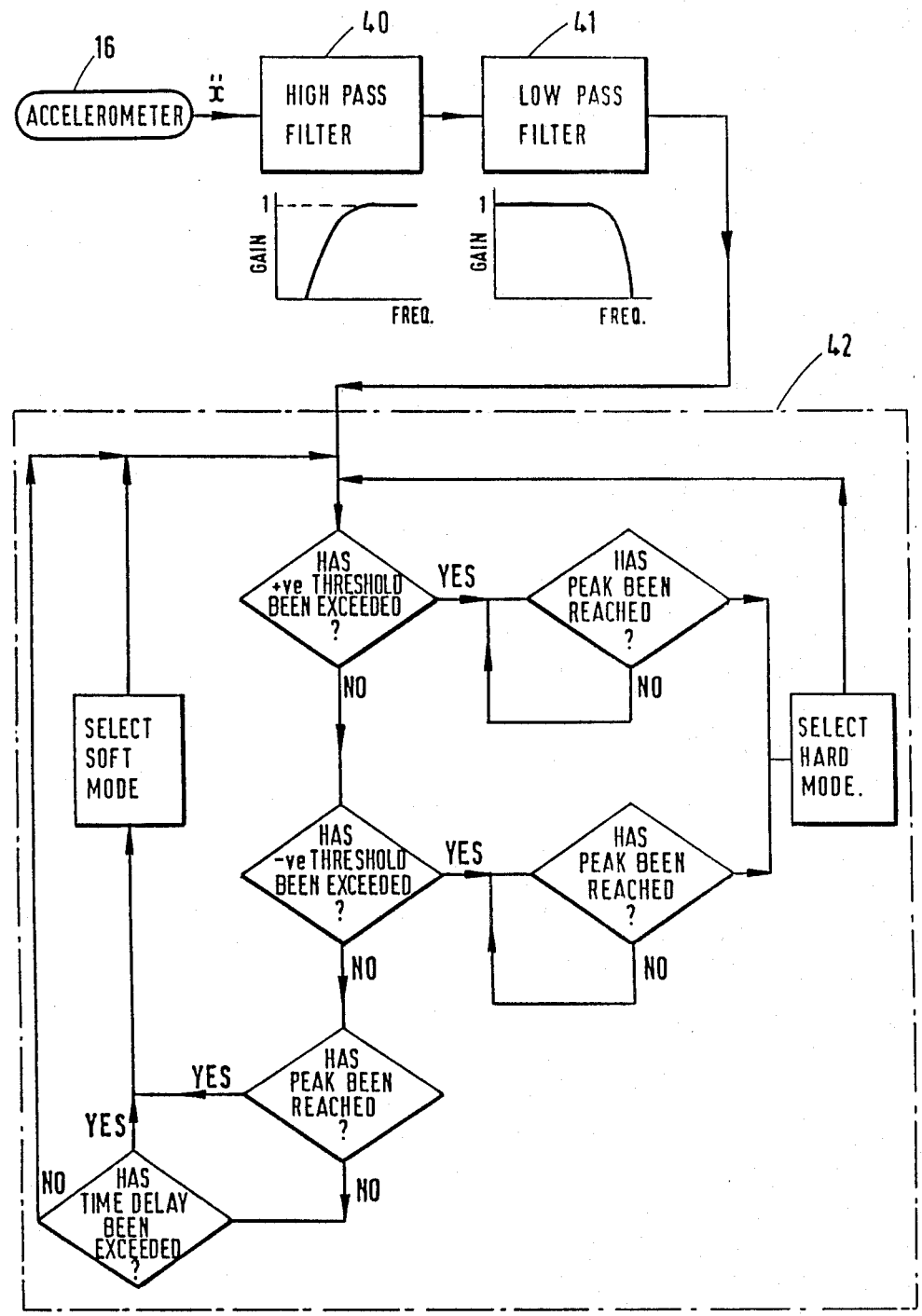
FIG. 7 is a flow chart of the control program for the control system according to a first modification of the first embodiment of the invention.
Figure 12:
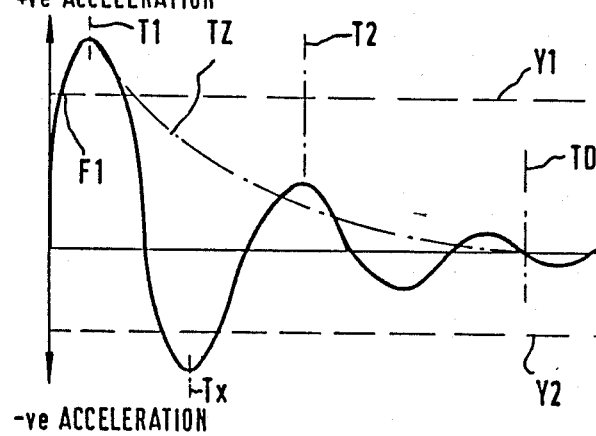
FIG. 12 is a graph of sprung mass vertical acceleration against time for the suspension system shown in FIGS. 2 to 5 and 7 showing the switching points.
Figure 13:
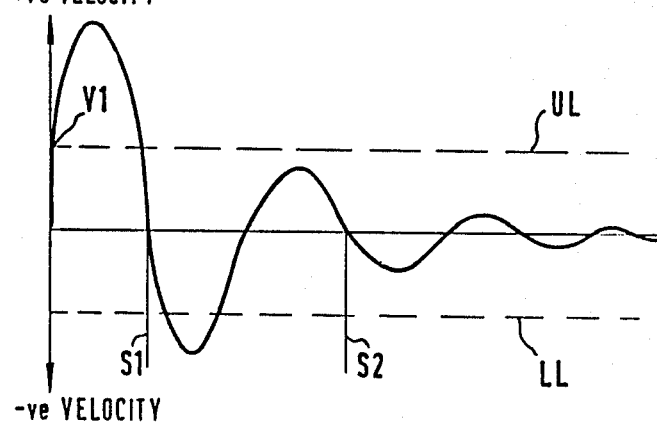
FIG. 13 is a graph of sprung mass vertical velocity against time for the suspension system shown in FIGS. 2 to 4 and 9 to 10 according to the second embodiment of the invention showing the switching points.

In a first modification of the first embodiment of the invention as shown in FIGS. 7 and 12 the suspension system is substantially as described with reference to the first embodiment, differing only in the control program and architecture of the central processor 42 as described hereafter.

With reference to FIG. 12 switching from the relatively soft setting to the relatively stiff setting is effected not when the pre-determined threshold level Y1 is exceeded at point F1 but at the first peak in acceleration thereafter, T1 in this case. The shock absorbers 12 will remain in their relatively stiff setting until the first peak in acceleration which does not exceed one of the pre-determined threshold level Y1,Y2 which in this case is point T1. The shock absorbers 12 will not revert to their soft setting at point Tx for this peak acceleration is greater than the pre-determined threshold level Y2 set for the rebound direction and would be the point where the shock absorbers 12 would be switched to their relatively stiff setting if point T1 did not exist.

If the damping of the system is very high then the motion of the body 13 will decay exponentially as shown by the line TZ and not as an oscilatory exponential decay as so far described. In this case after the initial peak T1 there will be no further peaks and so the shock absorbers would remain in their relatively stiff setting indefinitely. A time delay TD is therefore provided as part of the control program, if the time delay TD is exceeded then the shock absorbers 12 are restored to their relatively soft setting.

According to a second embodiment of the invention the acceleration signal from the accelerometer 16 is integrated to provide a signal indicative of vertical velocity of the body 13 which is then compared to pre-determined threshold levels UL,LL of velocity. If the vertical velocity of the body exceeds one of the pre-determined threshold levels UL, LL such as at point V1 then the shock absorbers 12 are switched from their relatively soft setting to their relatively stiff seting on the next occasion when the direction of motion changes, that is to say when the velocity is zero, such as at point S1. The shock absorbers 12 will remain in this relatively stiff setting until the first occasion, following a peak in velocity that does not exceed one of the levels UL, LL, when the direction of motion changes such as at point S2.

Figure 9:
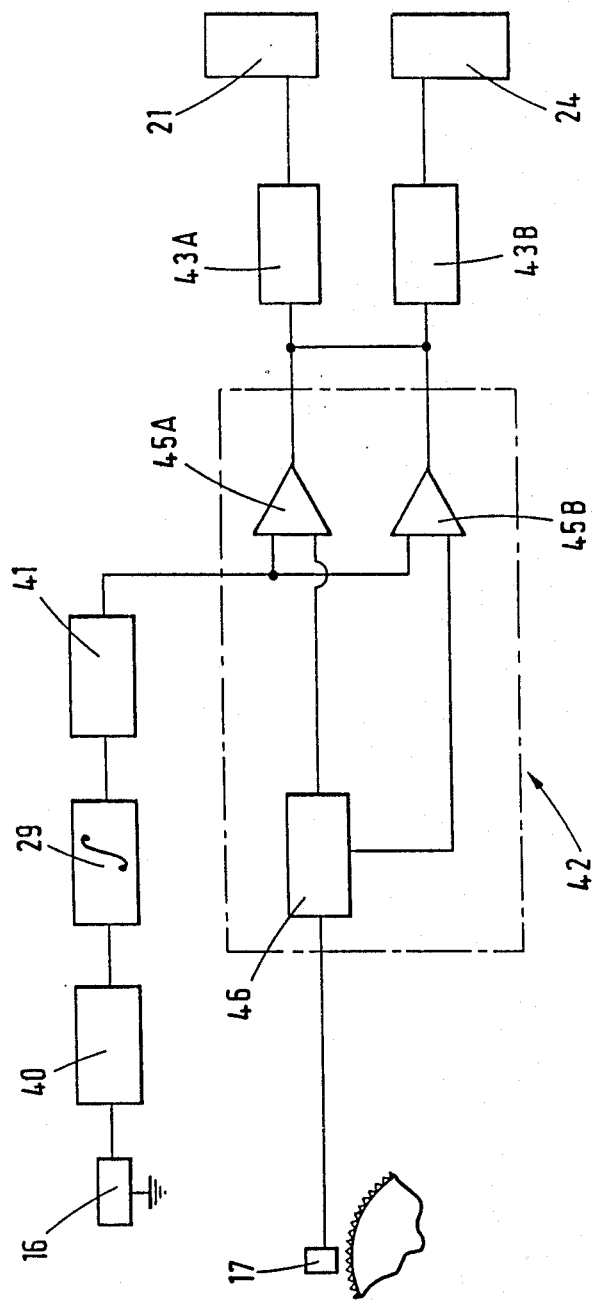
FIG. 9 is a block diagram of a control system forming part of the suspension system shown in FIGS. 2 to 4 according to a second embodiment of the invention.
Figure 10:
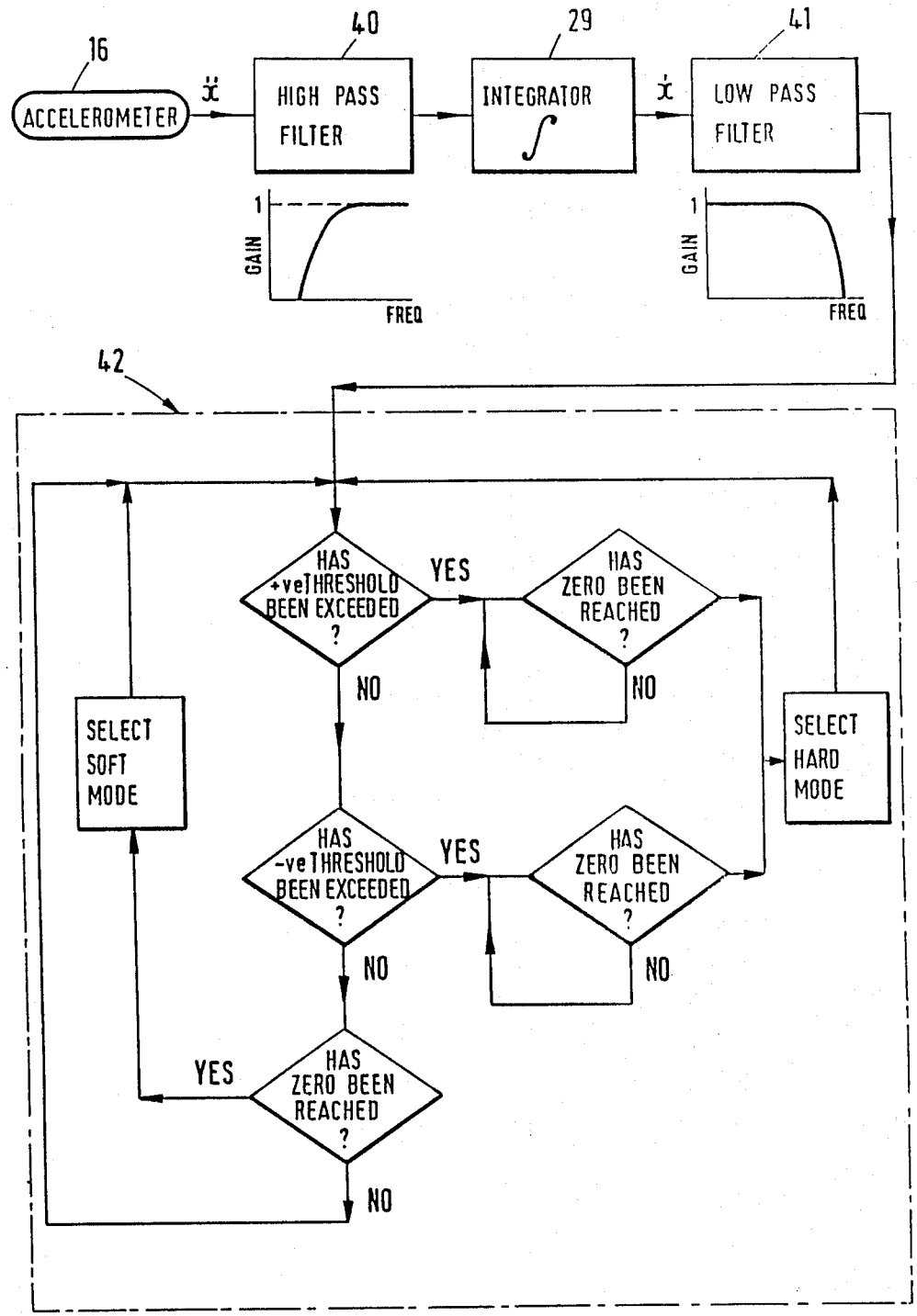
FIG. 10 is a flow chart of the control program for the control system according to the second embodiment of the invention.

The integration of the signal from the accelerometer 16 may be done electronically by providing an integrator unit 29 as shown on FIGS. 9 and 10 or it can be done mathematically as part of the control system program.

Further improvements of the system are possible the signal from the forward speed transducer 17 for example may be used to alter the pre-determined threshold levels so that as the forward speed of the vehicle increases the threshold levels of vertical acceleration or velocity are reduced thereby taking into account the increasing dynamic effects on the vehicle.

Alternatively, the system may be provided with shock absorbers having more than two settings. In one arrangement having three settings, the shock absorber has a third solenoid valve operable to change the damping effect in the bump direction from the relatively stiff setting to a relatively hard setting when actuated and a fourth solenoid valve operable to change the damping effect in the rebound direction from the relatively stiff setting to the relatively hard setting when actuated. A signal indicative of vehicle forward speed is supplied by the forward speed transducer 17 to the central processor 42 and is used to determine which of the settings is most appropriate. For example the shock absorbers are switched between the relatively soft setting and the relatively stiff setting at low speeds and between the relatively stiff setting and the relatively hard setting at higher speeds.

The system may also be extended to provide individual control at each corner of the vehicle body by the provision of an accelerometer at each corner above the adjacent wheel. In this case, not only ride thresholds as described above, but also roll and pitch control with their own discrete threshold levels and frequency filtering can be provided. This can apply to roll and pitch movements induced by ride motion or those resulting from braking, acceleration or steering manoeuvers. In the latter cases, suitable sensors are provided in the braking, throttle and steering systems to sense movements therein and particularly the rate of change of movement.

The relative movement between the wheel and the vehicle body may be sensed by displacement transducers, accelerometers or any other means, and the initiation of stiffer damping prevented when the wheel and body are moving in the same direction.

As it is believed that ride comfort depends more on the rate of change in movements of the vehicle body rather than simply on the magnitude of the movements involved, this system is able to provide a marked improvement in ride quality by means of a relatively simple and inexpensive modification of a conventional suspension system.

What is claimed is:

1. A suspension system for a vehicle comprising: at least one resilient means connecting a sprung mass and an unsprung mass; at least one damping means switchable between a relatively soft setting and a relatively stiff setting in both the bump and rebound directions for damping relative motion between the sprung mass and the unsprung mass; sensor means for sensing motion of the sprung mass; filter means for filtering a signal from the sensor means indicative of the frequency of motion of the sprung mass to provide a filtered signal having a band width of 0.3 Hz to 4.5 Hz; and control means having a response time which is substantially less than the period of one cycle of oscillation of the sprung mass, the control means being arranged to switch the at least one damping means between the relatively soft and relatively stiff settings in response to said filtered signal received from the sensor means, wherein the at least one damping means is switched to the relatively stiff setting when the motion of the sprung mass in either direction exceeds a pre-determined level of vertical acceleration of the sprung mass set for that direction of motion, the switching to the stiff setting occurring at the first peak vertical acceleration of the sprung mass following the pre-determined level set for that direction of motion being exceeded, and is restored to the relatively soft setting at the first peak in vertical acceleration of the sprung mass which does not exceed the pre-determined level set for that direction of motion.

2. A suspension system as claimed in claim 1 wherein if no further peak acceleration is sensed within a pre-determined period of time then the damping setting for the at least one damping means is restored to the relatively soft setting.

3. A suspension system as claimed in claim 1 wherein the pre-determined level of acceleration in each direction is reduced as the forward velocity of the vehicle is increased.

4. A suspension system as claimed in claim 2 wherein the pre-determined level of acceleration in each direction is reduced as the forward velocity of the vehicle is increased.

5. A suspension system as claimed in claim 3 wherein the pre-determined level of acceleration in the bump direction of motion is between 1.5 and 3.0 times that in the rebound direction.

6. A suspension system as claimed in claim 1 wherein the at least one damping means is a hydraulic shock absorber and the control means includes a first solenoid valve operable, when actuated, to change the damping effect in the bump direction from the relatively soft setting to the relatively stiff setting and a second solenoid valve operable, when actuated, to change the damping effect in the rebound direction from the relatively soft setting to the relatively stiff setting.

7. A suspension system as claimed in claim 6 wherein the sensor means is a single accelerometer positioned on the sprung mass to effect switching of all of the at least one damping means of the vehicle substantially simultaneously.

8. A suspension system for a vehicle comprising: at least one resilient means connecting a sprung mass and an unsprung mass; at least one damping means switchable between a relatively soft setting and a relatively stiff setting in both the bump and rebound directions for damping relative motion between the sprung mass and the unsprung mass; sensor means for sensing motion of the sprung mass; filter means for filtering a signal from the sensor means indicative of the frequency of motion of the sprung mass to provide a filtered signal having a band width of 0.3 Hz to 4.5 Hz; and control means having a response time which is substantially less than the period of one cycle of oscillation of the sprung mass, the control means being arranged to switch the at least one damping means between the relatively soft and relatively stiff settings in response to said filtered signal received from the sensor means, wherein the at least one damping means is switched to the relatively stiff setting at the first occasion that the direction of motion changes after a pre-determined level of vertical velocity set for that direction of motion has been exceeded and is restored to the relatively soft setting on the first occasion when the direction of motion of the sprung mass changes following a peak in velocity which does not exceed the pre-determined level of vertical velocity set for that direction of motion.

9. A suspension system as claimed in claim 8 wherein the pre-determined level of velocity in each direction is reduced as the forward velocity of the vehicle is increased.

10. A suspension system as claimed in claim 8 wherein the at least one damping means is a hydraulic shock absorber and the control means includes a first solenoid valve operable, when actuated, to change the damping effect in the bump direction from the relatively soft setting to the relatively stiff setting and a second solenoid valve operable, when actuated, to change the damping effect in the rebound direction from the relatively soft setting to the relatively stiff setting.

11. A suspension system as claimed in claim 8 wherein the sensor means is a single accelerometer positioned on the sprung mass to effect switching of all of the at least one damping means of the vehicle substantially simultaneously and that the signal from the sensor means is integrated before being compared with the pre-determined level.

* * * * *